Patented Feb. 8, 1938

2,107,473

UNITED STATES PATENT OFFICE 2,107,473

COMPOSITION AND METHOD FOR THE TREATMENT OF HYDROCARBON EMULSIONS

William E. Elliott, Youngstown, Ohio

No Drawing. Application September 12, 1934, Serial No. 743,713

2 Claims. (Cl. 196—4)

This invention relates to the treatment of emulsions of combustible hydrocarbons and to a composition for effecting the treatment whereby such emulsions can be broken down and the combustible hydrocarbons reclaimed or rejuvenated. The invention is an improvement over the inventions disclosed in my prior Patent No. 1,814,745 of July 14, 1931, and patents to Alexander B. Way, Nos. 1,638,021 and 1,638,022.

According to the above mentioned patents, it is proposed to treat combustible hydrocarbons with an aromatic crystalline hydrocarbon compound having mixed therewith certain other ingredients in the nature of a nitrated hydrocarbon as, for instance, nitro-benzol, and also preferably containing some material such as paraffin oil. Oil soluble red aniline is also preferably contained in the mixture. Such a mixture can be incorporated into fuel oil to break up emulsions and certain heavy compounds which exist in the oil, causing any water to separate and precipitate and improve the burning qualities of the oil. It can likewise be used to break up heavy hydrocarbon emulsions such as accumulate in storage tanks where fuel oil or crude oil is stored, and which is often referred to as "bottom sludge" or "tank bottoms". This heavy sediment is in the nature of an emulsion of hydrocarbons with water, and frequently contains in addition, dirt, silt, and other foreign substances. It is sometimes mixed with fuel oil to be burned, but when mixed with fuel oil it will rapidly settle out. By treatment in accordance with the above patents, particularly my prior patent, this bottom sludge or tank bottoms is broken up, the water, dirt and silt precipitated, and the hydrocarbons liberated. The freed hydrocarbons can be cracked for distillation purposes or can be mixed with fuel oil and will not segregate from the fuel oil.

In the use of such compounds, it is customary to heat the bottom sludge or tank bottoms to a temperature of approximately 120° F. or somewhat above, during the time that the compound is incorporated with the sediment and is operating to break down the emulsions and heavy solids. One lb. of the mixture can be successfully used for each 2000 gallons of sludge to be treated, although this ratio of treating compound to material to be treated varies somewhat according to the nature and the age of the sludge.

The operation of breaking down the sludge is usually carried out in exposed storage tanks and a considerable amount of steam is required to maintain the temperature of 120° F. or above, particularly in very cold weather, for the period of time required to complete the reaction. The aromatic crystalline hydrocarbon preferably employed is naphthalene. According to the present invention certain other materials are added to the naphthalene nitro-benzol mixture, depending somewhat on the character of the sludge to be treated, according to which the temperature and the time for the reaction to take place is decreased, thus effecting a saving of steam. Moreover, in most cases, such added ingredients increase the effectiveness of the naphthalene nitro-benzol compound, so that less of the compound needs to be used, and the materials which are added are preferably materials which cost considerably less than the naphthalene and nitro-benzol mixture.

The theory according to which compounds of this nature are effective in breaking up heavy hydrocarbon emulsions is not known to me, but apparently involves certain phases of physical chemistry and colloidal chemistry. The naphthalene compound is soluble in oil and not in water. By reason of this fact it apparently changes the surface tension of the oil particles in the emulsion which causes a breaking down or cracking of the emulsion. Once the action has been started, it continues throughout the entire mass of sludge, and the agitation produced by heating increases the rate at which this action occurs. Moreover, the reaction appears to take place more readily in a large mass or batch of sludge than it does in a test tube or small volume of emulsion. The emulsions in this sludge appear to be of two kinds. In one, the water is surrounded by oil, and in the other the oil is surrounded by water. It appears that the naphthalene, being insoluble in water and soluble in oil, is most effective in breaking up those emulsions where the oil envelops the water.

According to the present invention, there is used with the naphthalene compound some salt which is more readily soluble in water and which is not soluble in oil. This acts on that part of the emulsion which comprises oil particles enveloped in water. Moreover, this salt appears to be more effective when it is a hydrolyzable salt, as the salt of a strong base and a weak acid.

It is also apparently a character of some of these emulsions that the oil and the water do not segregate with the expected rapidity after cracking of the emulsion. This may be due to the fact that the densities of the two fluids are so close and that gravity separation does not occur, and it may be due to a certain dispersion of the oil particles through the water. The present invention contemplates the use of a relatively small amount of water-soluble salt, preferably a relatively heavy salt which when it goes into solution in the water, increases the density of the water or otherwise causes the water to separate out more rapidly.

It is further apparent that the stability of some of these emulsions is due to the presence of waxes, and I have found that by using a relatively small amount of a material which will dissolve wax, the action of the naphthalene compound will be accelerated, the amount of solvent relative to the amount of naphthalene compound being relatively small and being insufficient of itself to dissolve all of the wax in the batch of emulsion being treated. It appears that once the action has been started through the use of this solvent, it will continue through the mass.

For example, according to the present invention, there is added to the compound such as disclosed in my said prior patent, between 5% and 10% by weight of a salt which is readily soluble in water and which is not soluble in oil, and which is preferably a hydrolyzable salt. For example, ordinary soda ash or sodium carbonate can be effectively used in this connection. The sodium carbonate is added to the naphthalene preparation of my prior patent where the sludge being treated appears to be of the character in which a considerable portion of the emulsion is comprised of oil particles surrounded by water, and where it appears that the naphthalene compound does not readily penetrate the film of water to liberate the oil.

Where the sludge under treatment is of the character in which the water does not rapidly separate after the emulsion is cracked, there is added to the naphthalene compound of my prior patent, either along with the sodium carbonate or without the sodium carbonate, a salt which will cause the water to more rapidly settle, apparently by increasing the density of the water. Water-soluble metallic sulphates are satisfactory for this purpose. Ordinary iron sulphate is preferably used because it is both cheap and highly effective, but it is also understood that other water-soluble heavy salts can be used as, for instance, copper sulphate or ammonium sulphate. As a specific example, 1½ pounds of iron sulphate, commercially known as copperas, is added to each batch of naphthalene compound preparation of my said earlier patent in which a batch comprises approximately 70 pounds. While I give 1½ pounds of copperas as a specific example, this amount is not critical and can be varied by experiment on a batch of the emulsion to be treated.

As a third example, there may be mixed with the naphthalene compound of my prior patent a small amount of a solvent for wax, this to be used independently of the sodium carbonate and iron sulphate or along with either or both of these other two ingredients. For instance, in the mixing of the naphthalene preparation according to my prior patent, there may be added one pound of carbon tetrachloride. This, of course, is a liquid, but in the proportion of one pound in seventy of the naphthalene preparation, it is absorbed into the naphthalene preparation. When this preparation is incorporated into a sludge where the emulsion appears to be somewhat stabilized by the presence of wax, the solvent is effective for initiating the breaking up of the emulsion, whereupon the mass action and the influence of heat appears to carry it on. Where the solvent is mixed with the naphthalene and is so highly volatile, it is, of course, necessary to keep the preparation tightly packed in closed containers after it is mixed and until it is used, or to use it immediately after the solvent has been incorporated. Here again, the amount of solvent can be varied from the particular amount indicated.

Other salts which may be used in lieu of sodium carbonate are potassium carbonate, ammonium carbonate, and the corresponding bicarbonates.

Moreover, the addition materials, such as the carbonate or the sulphate, may be added to the sludge or oil under treatment either along with the naphthalene nitro-benzol, etc. mixture, or may be incorporated into the sludge or other hydrocarbon undergoing treatment after the naphthalene nitro-benzol preparation has been put into the sediment or other hydrocarbons.

In the foregoing examples I have referred specifically to the particular composition disclosed in my said patent wherein the mixture comprises naphthalene, nitro-benzol, paraffin oil, and oil-soluble red aniline, there being approximately one gallon of nitro-benzol to each 70 pounds of naphthalene, the white paraffin oil being added in the proportion of approximately 3 pounds of oil to 70 pounds of naphthalene, and the oil-soluble red aniline being substantially in the proportion of 2½ ounces of aniline to 70 pounds of naphthalene. The same addition materials may be used, however, in the method and with the compound disclosed in the said patents to Alexander B. Way, wherein the treating compound comprises crystalline aromatic hydrocarbon, such as naphthalene or anthracene, to which is added a nitrated hydrocarbon having only moderate explosive properties, such as nitro-benzol or nitro-toluol. In other words, the carbonate or the sulphate and/or the carbon tetrachloride can be used with any of the compounds disclosed in the said Way patents, and in substantially the proportions indicated above.

In the treatment of heavy sludges and sediment comprised of a hydrocarbon emulsion, particularly those which are of long standing, I find it advantageous to use all three of the addition materials to the naphthalene compound, i. e., one material for changing the surface tension of water, one for increasing the density of the water, and one for initiating the breaking down of waxes. While I have named certain specific ingredients as addition materials for these particular purposes, it will be understood that the invention contemplates the use of other materials which will be obvious to those skilled in the art and which will effect a like reaction.

I claim:

1. A compound for the treatment of emulsified hydrocarbons comprising principally naphthalene with a small quantity of nitro-benzol, sodium carbonate, carbon tetrachloride and iron sulphate.

2. The method of treating emulsified hydrocarbons to demulsify the same, which comprises incorporating therein naphthalene, sodium carbonate and iron sulphate with the naphthalene predominating the sodium carbonate and iron sulphate.

WILLIAM E. ELLIOTT.